United States Patent [19]

Mocker et al.

[11] Patent Number: 4,919,532
[45] Date of Patent: Apr. 24, 1990

[54] HIGH ACCURACY SEMICONDUCTOR LASER DOPPLER VELOCIMETER

[76] Inventors: Hans W. Mocker, 2215 Newton Ave. S., Minneapolis, Minn. 55405; Paul E. Bjork, 358 Flowerfield Rd., Circle Pines, Minn. 55014

[21] Appl. No.: 232,406

[22] Filed: Aug. 15, 1988

[51] Int. Cl.⁵ .......................... G01P 3/36; H01S 3/082
[52] U.S. Cl. .................................. 356/28.5; 356/351; 372/97
[58] Field of Search .................. 356/4.5, 28.5, 351; 372/96, 97

[56] References Cited

U.S. PATENT DOCUMENTS

| | | | |
|---|---|---|---|
| 4,611,912 | 9/1986 | Falk et al. | 356/28.5 |
| 4,643,575 | 2/1987 | Hazeltine | 356/28.5 |
| 4,738,531 | 4/1988 | Lloyd et al. | 356/152 |
| 4,805,185 | 2/1989 | Smith | 372/97 |

OTHER PUBLICATIONS

"Small Laser Doppler Velocimeter Based on the Self-Mixing Effect in a Diode Laser", by Jentink et al., Applied Optics vol. 27, No. 2, Jan., 1988.
"Directional Discrimination in the Self-Mixing Type Laser Doppler Velocimeter", by Shimizu, Applied Optics, vol. 26, No. 21, Nov., 1987.
"Interferometric Laser Rangefinder Using a Frequency Modulated Diode Laser", by den Boef, Applied Optics, vol. 26, No. 21, Nov., 1987.
"Laser Doppler Velocimeter Using the Self-Mixing Effect of a Semiconductor Laser Diode", by Shinohara et al., Applied Optics, vol. 25, No. 9, May, 1986.
"Range Finding Using Frequency-Modulated Laser Diode", by Beheim et al., Applied Optics, vol. 25, No. 9, May, 1986.
"Diode-Laser Random-Modulation CW Lidar", by Takeuchi et al., Applied Optics, vol. 25, No. 1, Jan., 1986.

*Primary Examiner*—Stephen C. Buczinski
*Attorney, Agent, or Firm*—John G. Shudy, Jr.

[57] ABSTRACT

A Doppler velocimeter having a semiconductor laser which sends a laser beam through a polarization beam splitter onto an fractional-wavelength plate. The plate both reflects the beam back to the polarization beam splitter and sends the beam on through the beam expander to the target. The beam is returned by the target. The returned beam passes through the fractional-wavelength plate to the polarization beam splitter. The returned and reflected beams are directed by the splitter to a detector. The detector mixes the beams and sends a signal to a spectrum analyzer on which the velocity of the target can be accurately determined.

12 Claims, 4 Drawing Sheets

HIGH ACCURACY SEMICONDUCTOR LASER DOPPLER VELOCIMETER

BACKGROUND OF THE INVENTION

The present invention pertains to velocimeters and particularly to laser Doppler velocimeters. More particularly, the invention pertains to semiconductor or solid-state laser Doppler velocimeters.

In the related art, laser Doppler velocimeters have been restricted to the use of visible and near infrared gas lasers because of their coherency and narrow linewidth. Semiconductor or solid-state lasers would be preferred for use in laser Doppler velocimeters because of size and weight considerations. However, the semiconductor or solid state lasers have not been used in Doppler velocimeters because of their relatively large linewidth, i.e., hundreds of megahertz (MHz), which prevents the attainment of a practicable or desired resolution in velocimeters.

SUMMARY OF THE INVENTION

The present invention circumvents the obstacle to making high resolution semiconductor laser velocimeters with the attainment of semiconductor lasers having narrow linewidths. The resulting invention is an accurate and very compact Doppler velocimeter. The invention has the advantages of providing eye safety in that the proposed semiconductor lasers can be operable at a wavelength of 1.54 microns ($\mu$m), be multi-function sensors, be low cost and be capable of significant component miniaturization. A feature of the 1.54 $\mu$m velocimeter is the incorporation of an external cavity for linewidth reduction in an indium gallium arsenide phosphide (InGaAsP) laser. Alternate techniques for line width reduction are the Distributed Feedback Laser (DFB) and the Cleaved Coupled Cavity ($C^3$-Laser). While these techniques are limited to linewidth of tens of megahertz, the external cavity can achieve a linewidth of less than 100 KHz. The 1.06 $\mu$m velocimeter incorporates a diode-pumped neodynium yttrium aluminum garnet (Nd:Yag) laser. The invention concept may be extended to a multifunctional sensor capable of velocity and range determination using coherent detection. Applications of a semiconductor laser Doppler velocimeter having high resolution include that as hover sensors for helicopters, and docking sensors for space shuttles and robotic sensors. For instance, some new helicopters will require a hover sensor for the "pop up" mode in which the helicopter holds over a defined spot over a 2-3 minute time interval independent of cross winds up to 35 miles per hour. The hover hold requirements are approximately 2 centimeters per second. The present invention, having laser device design and techniques which result in narrow beam spread and short wavelength, can provide sensing meeting such accuracy requirements. The present invention has the capability to provide laser Doppler velocity resolution as fine as 0.5 centimeter/second over remote distances.

In the art, semiconductor lasers have been noted to have inherently large linewidths (i.e. 100's of MHz). In the invention, the linewidth of the semiconductor laser is reduced by about 4 orders of magnitude thereby making it feasible for coherent detection. Some of the advantages of the narrow linewidth semiconductor laser are eye-safe operation, accurate velocity detection, component miniaturization and low cost.

The invention satisfies a need for a stealthy ground velocity sensor that can replace presently used radar altimeters and microwave Doppler systems. With their miniaturization, e.g., tennis ball size, such systems are covert, accurate, and effectively countermeasure-proof.

DESCRIPTION OF THE PREFERRED EMBODIMENTS

Figure 1:
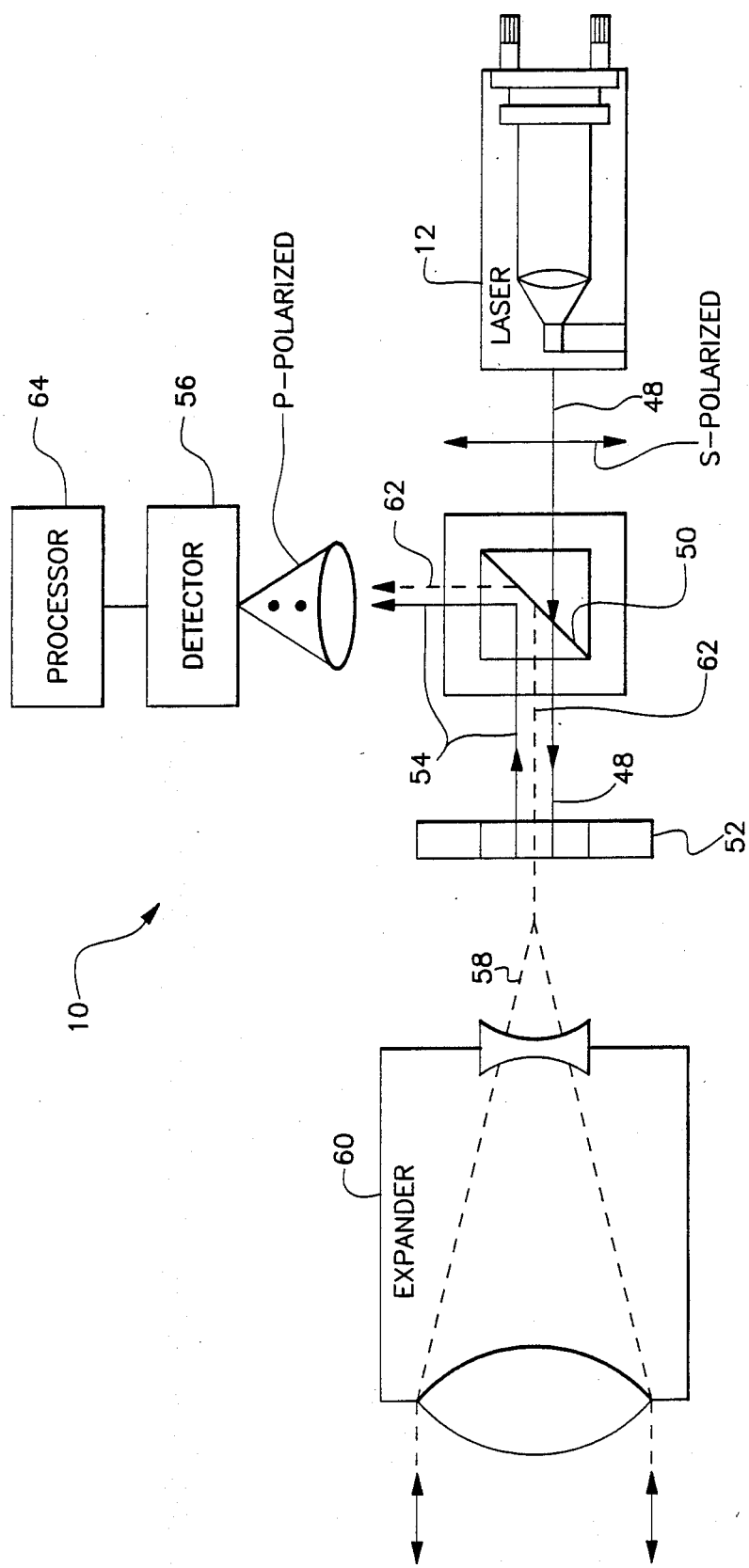
FIG. 1 is a diagram of the invention.
Figure 2:
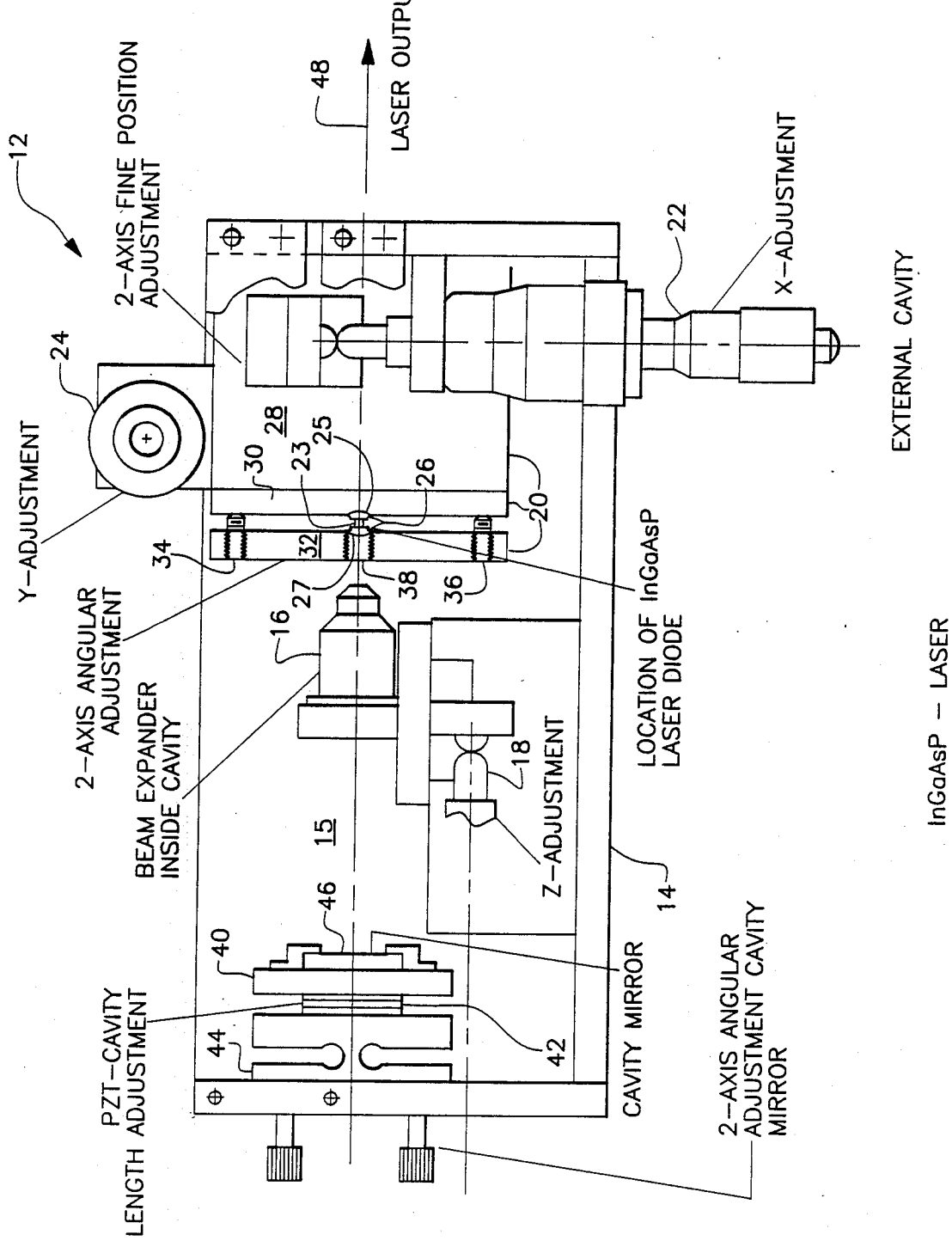
FIG. 2 is a drawing of the external cavity InGaAsP laser.

The high precision semiconductor laser velocimeter 10 of FIG. 1 has a miniaturized, external cavity InGaAsP laser 12 that produces a 1.54 micrometer ($\mu$m) wavelength light beam. Laser 12 is frequency stable with a linewidth of 40 kilohertz (kHz). Laser 12 is a continuous wave device. The linewidth of laser 12 is an improvement of about four orders of magnitude over the linewidth of a corresponding solitary laser diode. In FIG. 2, external cavity laser 12 has a stable cavity 14 constructed of invar for thermal stability and acoustic isolation. Cavity 14 holds in a concentric fashion an optical beam expander 16 which has a fine adjustment 18 for the Z position. The front end of cavity 14 houses two-axis adjustment 20 having a two-axis trapezoidal fine position adjustment, an X-adjustment 22 and a Y-adjustment 24, for InGaAsP diode chip 26. InGaAsP chip 26 is mounted so as to receive cooling from Peltier electric cooler 30 mounted on block 28. Invar slab 32 is mounted so as to have two-axis angular adjustments 34 and 36. Also center threaded holder 38 provides for fine adjustment of diode 26 in the Z axis.

Rear reflector-grating or mirror holder 40 is mounted on piezoelectric transducer (PZT) element 42. Holder 40 holds cavity mirror 46 in cavity 12. PZT element 42 provides a one-time phase adjustment for the phase of the optical wave of the external feedback cavity to be "in-phase" with the optical wave in the solitary diode. PZT element 42 is mounted on two-axis angular adjustment element 44 which in turn is end-mounted in invar cavity 12.

Figure 3:
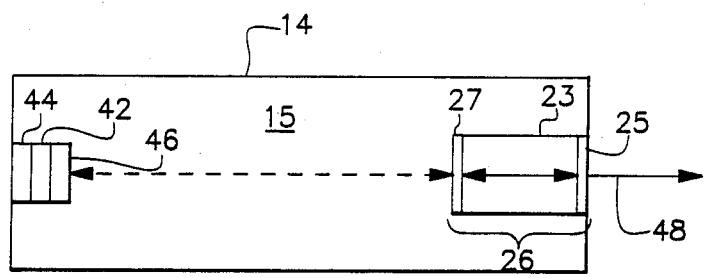
FIG. 3 shows the basic relationship between the passive external cavity and the active internal cavity.

Chip 26, in FIG. 3, functions as an active internal cavity 23 for the laser light. The typical length of the internal cavity 23 is about 0.02 centimeter. Laser light is emitted from the laser diode through a partially reflective coating 27 situated at one end of the solitary diode. The emitted laser light goes through space 15 of passive external cavity 14 of about 10 centimeters in length, to a fully reflective cavity mirror 46. The laser light is reflected back through mirror 27 into laser diode 23. The laser light reflected back into cavity 23 is of a very stable frequency and is in phase with the laser light of internal cavity 23. The laser light coming from space 15 of cavity 14 provides wave reinforcement or constructive interference amounting to strong feedback of resonant external cavity space 15 to the oscillation frequency of laser diode 23. From diode 23 through partially (i.e., about 40%) reflecting mirror 25 exits narrow linewidth laser 48 through mirror 50 of FIG. 1. Mirror 27 is partially reflective so as to reflect some of the laser light back within the respective cavities 14 and 23. Mirror 25 is similarly partially reflective so as to reflect some of the laser light back within diode 23.

In velocimeter 10, of FIG. 1, external cavity laser 12 sends out laser beam 48 having a linear polarization (S-polarization) and passes through polarization beam splitter 5 unattenuated since the S-vector is oriented in transmission direction. Beam 48 moves on to quarter-wavelength plate 52. The rear facet of plate 52 reflects beam 54 which is beam 48 with its linear polarization rotated 90° (P-Plane). Beam 54 is reflected by polarization beam splitter 50 to detector 56. Beam 54 is the local oscillator signal to detector 56. Plate 52 converts linearly polarized beam 48 into circularly polarized beam 58 which in turn goes through beam expander 60 on to a target. The target reflects beam 58 which passes through beam expander 60 and quarter-wavelength plate 52 and becomes beam 62 linearly polarized in the same direction (P-Polarization) a beam 54. Beam 62 is reflected by polarization beam splitter 50 onto detector 56. Mixing of beams 54 and 62 takes place on the surface of detector 56 The beat spectrum of the two beams 54 and 62, due to the Doppler effect caused by the moving target is electrically transmitted to and displayed on spectrum analyzer 64 for determination of target velocity.

Polarization of the laser beam at various points of system 10, as noted above, may be removed but only at a great loss of efficiency. But the resulting inefficient system hardly allows such a velocimeter to be practicable.

Figure 4:
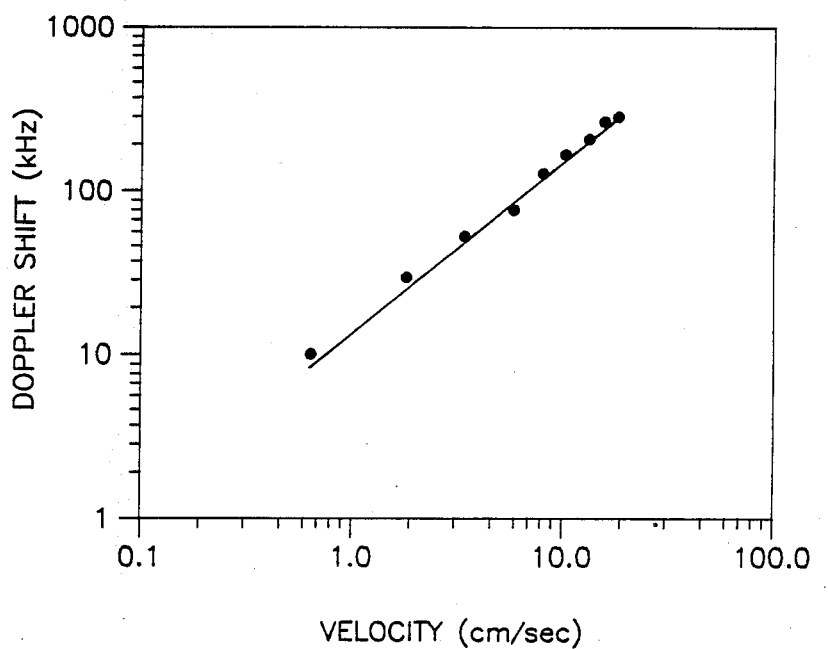
FIG. 4 is graph showing Doppler resolution measurements of the invention utilizing the InGaAsP laser.
Figure 5:
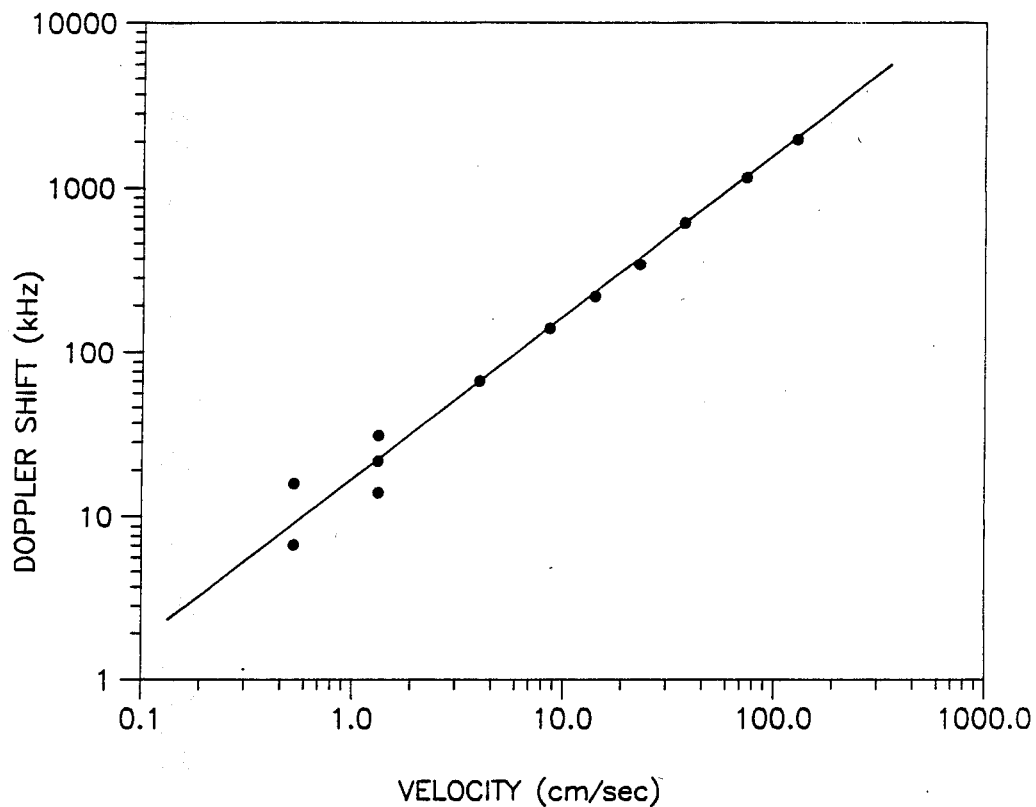
FIG. 5 is a graph indicating Doppler resolution measurements of the invention utilizing the Nd:YAG laser.

In lieu of external cavity InGaAsP laser 12, a diode-pumped Nd:YAG laser which is well known in the art may be utilized. An ADLAS model DPY 100 diode-pumped Nd:YAG laser distributed by AB Lasers at 336 Baker Ave. of Concord, Mass. 01742, may be used in system 10. The performance characteristics of the InGaAsP and Nd:YAG lasers have been determined with Doppler targets over laboratory distances of about 6 meters. The results are shown in FIGS. 4 and 5, for the 1.55 $\mu$m InGaAsP laser and the 1.06 $\mu$m Nd:YAG laser, respectively.

The embodiments of an invention in which an exclusive property or right is claimed are defined as follows:

1. A high accuracy semiconductor laser Doppler velocimeter comprising:
   an external cavity semiconductor laser for generating a first light beam, wherein said external cavity semiconductor laser comprises:
   an active internal cavity having first partially reflecting mirror means at a first end of said internal cavity, having second partially reflecting mirror means at a second end of said internal cavity, and having said first and second partially reflecting mirror means parallel to each other; and
   a passive external cavity having said active internal cavity at a first end and having a fully reflecting mirror at a second end of said external cavity, wherein said active internal cavity and the fully reflecting mirror are positionally alignable for generating the first light beam having a narrow linewidth;
   a polarized beam splitter for passing said first light beam;
   a dual-functional fractional wavelength plate for receiving said first light beam, reflecting a second light beam, transmitting a third light beam to a target, receiving said third light beam from the target and transmitting a fourth light beam;
   said polarized beam splitter for receiving and reflecting said second and fourth light beams; and
   a detector for receiving said second and fourth light beams, comparing said fourth light beam with said second light beam, and determining a velocity of the target.

2. Apparatus of claim 1 further comprising:
   a first mount attached to the second end of said external cavity and attached to and supporting the fully reflecting mirror having a piezoelectric length adjustment sensitive to temperature and having a two-axis angular adjustment for compensating variations of external cavity length due to temperature variations and for providing proper phase adjustment; and
   a second mount attached to the first end of said passive external cavity, having a temperature stabilizer, a two-axis angular adjustment and a two-axis linear adjustment, for supporting, aligning and stabilizing said active internal cavity.

3. Apparatus of claim 2 wherein:
   said active internal cavity has a laser light being reflected between the first and second ends of said active internal cavity;
   said passive external cavity has some of the laser light emitted from the second end of said active internal cavity and reflected by the fully reflecting mirror back through the second end of said active internal cavity, in a continuous fashion, stabilizing the frequency of the laser light reflected between the first and second ends of said active internal cavity; and
   said active internal cavity emits through the first end of said internal cavity some of the laser light reflected between the first and second ends of said internal cavity, as said first light beam.

4. Apparatus of claim 3 wherein:
   said first light beam has a first polarization;
   said second light beam has a second polarization;
   said third light beam has a third polarization; and
   said fourth light beam has a fourth polarization.

5. Apparatus of claim 4 wherein the determining of the velocity of the target by said detector is a result of a Doppler frequency shift of said fourth light beam from a frequency of said second light beam.

6. Apparatus of claim 5 wherein said external cavity further comprises a beam expander, situated between the first end and the second end of said external cavity, having a position adjustment.

7. Apparatus of claim 6 wherein said fractional wavelength plate is a quarter-wavelength plate having a coating to reflect a proper amount of the first light beam as a local oscillator.

8. Apparatus of claim 7 further comprising a beam expander receiving said third light beam from said fractional wavelength plate, transmitting said third light beam to the target, receiving said third light beam reflected from the target, and transmitting said third light beam to said fractional wavelength plate.

9. Apparatus of claim 8 wherein the wavelength of said first light beam has a narrow linewidth of less than 100 kilohertz.

10. Apparatus of claim 9 wherein:
    a distance between the second end of said active internal cavity and the fully reflecting mirror is approximately between five and twenty centimeters; and a distance between the first and second ends of said active internal cavity is approximately between 0.01 and 1.00 centimeter.

11. Apparatus of claim 10 wherein said active internal cavity comprises an InGaAsP laser diode.

12. Apparatus of claim 11 wherein said external cavity further comprises a housing comprising invar.

* * * * *